United States Patent Office 2,923,416
Patented Feb. 2, 1960

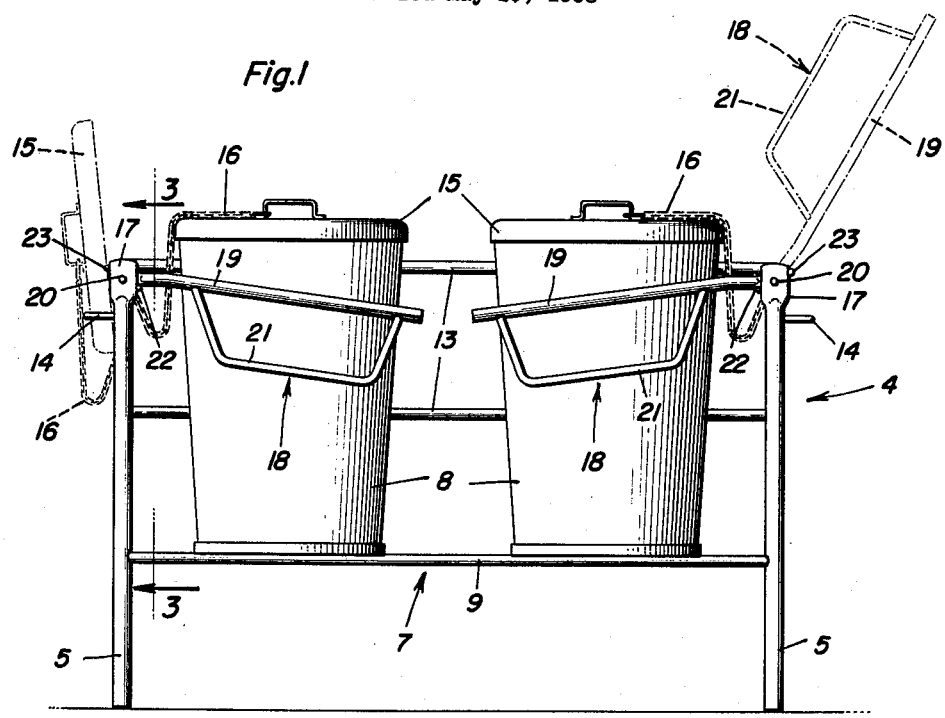
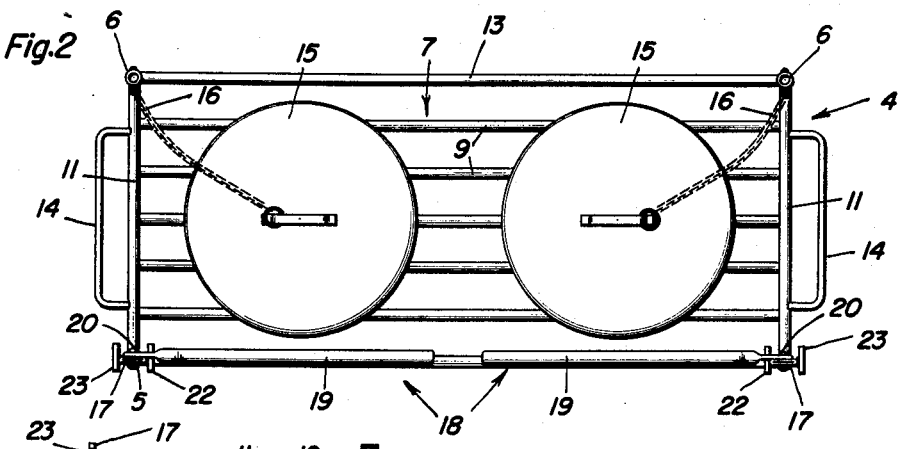
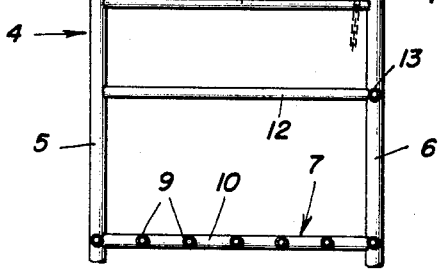
Frank N. Vogel
INVENTOR.

2,923,416
GARBAGE CAN RACK
Frank N. Vogel, San Angelo, Tex.

Application May 19, 1958, Serial No. 736,351

2 Claims. (Cl. 211—71)

The present invention relates to new and useful improvements in garbage can racks and has for one of its important objects to provide means for supporting one or a plurality of cans in an elevated position to facilitate depositing garbage therein, to prevent the tipping over thereof, as by the wind, and to exclude marauding animals.

Another important object of the invention is to provide, in a rack of the character described comprising a stand open at its front for the easy placement of the cans therein or removal therefrom for emptying, gravity operated gates of a novel construtcion for closing said front.

Still another important object of the present invention is to provide a rack of the aforementioned character which includes means for holding the can covers in a position conveniently at hand when they are removed from the cans, also means for preventing loss or theft of said covers at all times.

Other objects of the invention are to provide a garbage can rack of the character set forth which will be comparatively simple in construction, strong, durable, compact, of lightweight, attractive in appearance and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in front elevation of a rack constructed in accordance with the present invention, showing a pair of garbage cans mounted therein;

Figure 2 is a top plan view thereof; and

Figure 3 is a vertical sectional view taken substantially on the line 3—3 of Figure 1 with the lower portions of the legs broken away.

Referring now to the drawing in detail, it will be seen that the embodiment of the invention which has been illustrated comprises a stand of suitable metal which is designated generally by reference character 4. The stand 4, which may also be of any desired dimensions, includes pairs of front and rear tubular legs 5 and 6, respectively.

Mounted on the legs 5 and 6 at an intermediate point is a grill 7. The grill 7 is adapted to receive thereon and support the garbage cans, as indicated at 8. The stand 4 is open at its front to facilitate mounting the cans 8 on the grill 7 for removing said cans therefrom. As shown to advantage in Figure 2 of the drawing, the stand 4 is substantially rectangular in plan. The grill 7 comprises longitudinal and transverse tubular bars or rods 9 and 10, respectively. The outermost members 9 are affixed to the legs 5 and 6. The intermediate members 9 are affixed to the members 10.

Above the grill 7 vertically spaced upper and lower tubular rods or members 11 and 12, respectively, extend horizontally between the front and rear legs 5 and 6, respectively, of the stand 4. Substantially similar rods or members 13 extend between the rear legs 6 of the stand 4.

Mounted on the rods 11 of the stand 4 are loops or yokes 14 for receiving and holding the usual covers 15 of the cans 8 when said covers are removed from said cans. The members 14 also provide handles for lifting and moving the stand 4, if desired. Chains 16 anchor the can covers 15 to the legs 6 of the stand 4.

In the embodiment shown, the legs 5 terminate in flattened upper end portions 17. Gravity closed gates 18 are provided for the open front of the stand 4. The gates 18 comprise bars 19 having one end portion pivotally secured at 20 to the upper end portions 17 of the legs 5. The gates 18 further comprise loops 21 which depend from the bars 19. The bars 19 are engageable on stops 22 which are provided therefor on the legs 5 for supporting the gates 18 in closed position. Substantially similar stops 23 are also provided on the upper end portions of the legs 5 for engagement by the bars 19 for supporting the gates 18 in open position as shown in broken lines in Figure 1 of the drawings.

It is thought that the use of the rack will be readily apparent from a consideration of the foregoing. Briefly, to mount the cans 8 on the grill 7, the gates 18 are swung upwardly to open position where they rest against the stops 23, thus opening the front of the stand 4. When in lowered or closed position, the gates 18 rest on the stops 22 and retain the cans 8 in the stand 4. When the covers 15 are removed from the cans 8, said covers are inserted in the loops 14 in an obvious manner. Of course, the chains 16 positively prevent loss or theft of the can covers 15. With the cans 8 supported in an elevated position as shown, the covers 15 may be removed therefrom, garbage deposited therein and said covers replaced without the necessity of bending over.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A garbage can rack comprising: a metallic stand open at its front for the insertion and removal of the cans, said stand including pairs of tubular front and rear legs and a tubular grill mounted on said legs at an intermediate point for supporting the cans, a pair of gravity closed gates swingable in a vertical plane on the stand for closing the front thereof, said gates including bars having one end portion pivotally secured to the upper end portions of the front legs and further including loops depending from said bars, stops on the front legs engageable beneath the bars for supporting the gates in closed position, and stops on said front legs engageable with said bars for supporting said gates in an open position, said bars resting by gravity on said stops when the gates are in either position.

2. A garbage can rack comprising, in combination, a stand for receiving and supporting the cans, and covers for the cans anchored to the stand, said stand including front and rear legs, rods extending horizontally between said front and rear legs, and yokes mounted horizontally on said rods, said yokes providing handles for lifting the stand and further providing, in conjunction with the rods, holders for the reception of the covers when said covers are not in use.

References Cited in the file of this patent
UNITED STATES PATENTS

| | | |
|---|---|---|
| 209,257 | Hadley | Oct. 22, 1878 |
| 2,609,103 | Gravos | Sept. 2, 1952 |

FOREIGN PATENTS

| | | |
|---|---|---|
| 286,029 | Switzerland | Feb. 2, 1953 |